(12) United States Patent
Vargantwar et al.

(10) Patent No.: US 9,408,124 B2
(45) Date of Patent: Aug. 2, 2016

(54) CALL INITIATION MESSAGE DELAY DURING HANDOFF PROCESS

(71) Applicant: Verizon Patent and Licensing Inc., Arlington, VA (US)

(72) Inventors: Sachin Vargantwar, Cummings, GA (US); Rodrigo Teliaken Rodelas, Alpharetta, GA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 125 days.

(21) Appl. No.: 14/336,538

(22) Filed: Jul. 21, 2014

(65) Prior Publication Data

US 2016/0021587 A1    Jan. 21, 2016

(51) Int. Cl.
*H04W 4/00*        (2009.01)
*H04W 36/14*       (2009.01)
*H04W 36/00*       (2009.01)

(52) U.S. Cl.
CPC .......... *H04W 36/14* (2013.01); *H04W 36/0055* (2013.01)

(58) Field of Classification Search
None
See application file for complete search history.

(56) References Cited

U.S. PATENT DOCUMENTS

| 2010/0202458 | A1* | 8/2010 | Sato ............................. 370/392 |
| 2012/0039303 | A1* | 2/2012 | Stenfelt et al. ................ 370/331 |
| 2012/0149430 | A1* | 6/2012 | Siomina et al. ............... 455/525 |

* cited by examiner

*Primary Examiner* — Kevin C Harper

(57) ABSTRACT

A network gateway receives a voice over long term evolution (VoLTE) call establishment request from an internet protocol (IP) multimedia services (IMS) core network for a mobile device. The network gateway queries a serving gateway to determine whether the mobile device is transitioning from a first evolved node B (eNB) to a second eNB. If the mobile device is transitioning, based on the existence of a user plane modify request, the network gateway delays forwarding the received request to a mobility management entity until the serving gateway informs the network gateway that the serving gateway received a first data packet from the mobile device via the second eNB as an indication the transition is complete.

20 Claims, 3 Drawing Sheets

CALL INITIATION MESSAGE DELAY DURING HANDOFF PROCESS

BACKGROUND

In recent years, mobile wireless communications have become increasingly popular. Currently, mobile networks are operational that conform with the fourth generation (4G) standards, such as the Long Term Evolution (LTE) standard. These mobile networks provide voice communication, messaging, email and internet access (for example) by using radio frequency communication. Increasingly, mobile network operators are deploying Voice over LTE (VoLTE) capabilities within their mobile networks. VoLTE utilizes a dedicated bearer channel between a mobile device and a packet data network (PDN) gateway (PGW) to deliver voice (and/or video) as data packets to/from the mobile device.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

Figure 1:
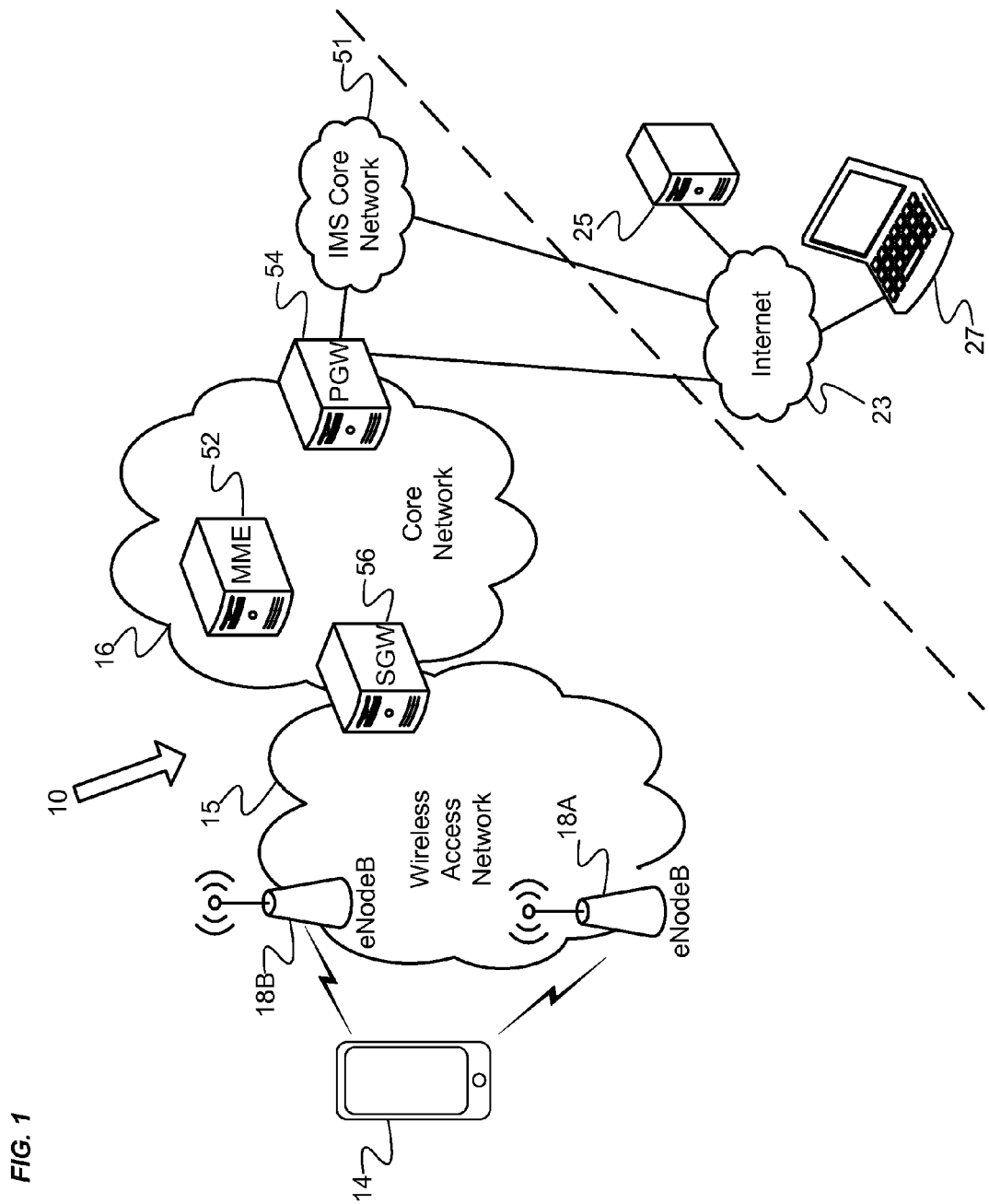
FIG. 1 is a functional block diagram of an example of a system which may process a handoff event and establishing a dedicated bearer channel.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

A mobile wireless communication network that supports the long term evolution (LTE) standard carries all traffic, for example, as packets of data, typically conforming to the internet protocol (IP) standard. When a mobile device connects to such a mobile network, the mobile network establishes, for example, a default bearer channel on behalf of the mobile device over which traffic destined to/from the mobile device will pass. Unlike prior circuit switched networks where a physical or logical (e.g., timeslot based) circuit was utilized, a bearer channel in a LTE mobile network is, for example, a virtual tunnel or template defining how elements within the LTE mobile network will handle traffic assigned to and/or matching the virtual tunnel/template. Thus, the default bearer channel, in this example, is a definition of how to handle packets of traffic to/from the mobile device by elements of the LTE mobile network, typically using a best effort quality of service (QoS).

Typically, traffic to/from a mobile device connected to a LTE mobile network will utilize a default bearer channel. When there will be a call involving voice communications, e.g. a voice or video call, to or from the mobile device, there is an exchange of signaling to establish the virtual call connection through the network and over the air with the mobile device. Current LTE/IMS networks use session initiation protocol (SIP) for at least some of the signaling messages. During call set-up, the signaling messages utilize the default bearer channel.

Because the default bearer channel is, for example, only a best effort QoS, the default bearer channel is insufficient to carry traffic requiring a higher QoS (e.g., voice, video). As such, after a voice call is established with the mobile device connected to the LTE mobile network (e.g., voice over LTE (VoLTE)), an IP multimedia services (IMS) core network involved in establishing the voice call may request, for example, that the LTE mobile network establish a dedicated bearer channel (e.g., virtual tunnel/template with higher QoS). In this example, subsequent voice traffic packets associated with the VoLTE call may pass over the established dedicated bearer channel (e.g., elements of the LTE mobile network will treat the VoLTE call with a higher QoS). As can be seen from this example, the signaling messages used to establish the call typically use the default bearer channel while the voice (and/or video) packets of the established VoLTE call typically use the dedicated bearer channel.

Normally, when the request to establish the dedicated bearer channel for the VoLTE call is received from the IMS core network by a packet gateway, such as a packet data network gateway (PGW) of the LTE mobile network, the packet gateway (e.g., PGW) forwards the request to a management node, such as a mobility management entity (MME) of the LTE mobile network, and the management node directs a serving gateway, such as a serving packet data network gateway (SGW) currently serving the mobile device, to establish the dedicated bearer channel between the serving gateway (e.g., SGW) and the mobile device via a first wireless network node, such as an evolved node B (eNodeB). However, if the mobile device is transitioning away from and is no longer associated with the first wireless network node, establishment of the dedicated bearer channel will fail. This dedicated bearer channel establishment failure may cause the VoLTE voice call traffic to lack a sufficient higher QoS and call quality may be impacted.

The examples described in detail below relate to techniques for delaying establishment of a dedicated bearer channel to support a VoLTE call (e.g., requiring a higher QoS, such as a voice and/or video call) when a mobile device is transitioning between two wireless network nodes (e.g., eNodeBs) until after the transition is complete. In one example, a mobile device is transitioning between a first wireless network node and a second wireless network node. During the transition (e.g., handoff, handover), a management node (e.g., MME) records the mobile device as still being associated with the first wireless network node. When the transition is complete, in this example, the management node is updated to reflect that the mobile device is associated with the second wireless network.

In a further example, when a packet gateway of the mobile wireless communication network (e.g., PGW) receives, from an IMS core network, a request to establish a dedicated bearer channel to support a VoLTE call, the packet gateway (e.g., PGW) first queries a serving gateway (e.g., SGW) to determine whether the mobile device is transitioning. If the mobile device is transitioning, in this example, the serving gateway (e.g., SGW) may have received a user plane modify request from the mobile device and the serving gateway will notify the packet gateway of such user plane modify request in response to the packet gateway's query. The user plane modify request is, for example, an indication from the mobile device that the mobile device is transitioning between two wireless network nodes, as described in greater detail below. Upon receiving the response indicating that the mobile device is transitioning, the packet gateway (e.g., PGW) delays forwarding the request from the IMS core network to the management node until the packet gateway receives an indication that the transition is complete from the serving gateway. The serving gateway, in this further example, learns that the transition is complete when the serving gateway receives a first data packet from the mobile device via the second wireless network node. In this way, the management node typically will not receive the request to establish the dedicated bearer channel until after the transition is complete and the management node has been updated with a record indicating the mobile device is associated with the second wireless network node. When the management node receives the delayed dedicated bearer channel establishment request, the management node instructs the serving gateway, for example, to establish the dedicated bearer channel between the serving gateway and the second wireless network node to which the mobile device is now associated.

Reference now is made in detail to the examples illustrated in the accompanying drawings and discussed below. FIG. 1 is a functional block diagram of an example of a system 10 that supports various mobile communication services and which may implement processing for establishing a dedicated bearer channel during a handover event.

The illustrated system 10 services any number of mobile devices, including the illustrated mobile device 14. Mobile device 14 may be a laptop, a personal digital assistant ("PDA"), a smartphone, a tablet PC or another portable device designed to communicate via a wireless network. Mobile device 14 in the example corresponds to a smartphone or tablet itself having network communication capability. Although not shown for simplicity, the present dedicated bearer establishment during handover techniques also may be used with other types of devices, for example, mobile broadband devices like Jetpacks or USB dongles that provide service connectivity for other types of data devices (e.g. non-mobile/wireless computers or the like).

A carrier offering long term evolution (LTE) and voice over LTE (VoLTE) mobile services operates a network having equipment forming a portion of the network supporting LTE services. Although various network architectures may be used to form the network, the drawing shows an arrangement using one or more wireless access networks 15 and a core network 16, operated by one mobile carrier. Hence, the illustrated system example includes a mobile communication network 10, in this case, operated in accordance with 4G LTE standards. Mobile network 10 may provide mobile telephone communications as well as Internet data communication services. For example, mobile network 10 may connect to the public switched telephone network (PSTN, not shown) and public packet-switched data communication networks such as the Internet 23 via packet data gateway (PGW) 54. Data communications via mobile network 10 provided for users of mobile devices 14 may support a variety of services such as communications of text and multimedia messages, e-mail, web browsing, streaming or downloading content, etc. with network connected equipment such as a server 25 and/or laptop computer 27 in the drawing. Voice communication also may involve transport via the Internet 23 using voice over Internet Protocol (VoIP) technologies.

Mobile device 14 may connect to mobile network 10 through wireless access network 15 via wireless network nodes such as eNodeBs 18A, 18B, two of which appear in the drawing by way of example.

The illustrated system 10 can be implemented by a number of interconnected networks. Hence, the overall network 10 may include a number of wireless access networks 15, as well as regional ground networks interconnecting a number of wireless access networks and a wide area network (WAN) interconnecting the regional ground networks to core network elements. A regional portion of the network 10, such as that serving mobile device 14, can include one or more wireless access networks 15 and a regional packet switched network and associated signaling network facilities.

Physical elements of a 4G LTE wireless access network 15 include a number of nodes referred to as eNodeBs represented in the example by eNodeBs 18A, 18B. Although not separately shown, such an eNodeB can include a base transceiver system (BTS), which can communicate via an antennae system at the site of eNodeB and over the airlink with one or more mobile devices 14, when any mobile device is within range. Each eNodeB can include a BTS coupled to several antennae mounted on a radio tower within a coverage area often referred to as a "cell." The BTS is the part of the radio network that sends and receives RF signals to/from the mobile device 14 that is served by eNodeB 18A, 18B. Such eNodeBs 18A, 18B operate in accordance with the more modern LTE network standard, sometimes referred to as 4G and/or 4G LTE. Packet routing and control functions may be implemented in packet routers and/or associated server platforms in the wireless access network or in many cases in elements of an IP Multimedia Service (IMS) core network 51 coupled to some number of 4G wireless access networks 15 via core network 16, although such routing and control element(s) are generically included in the broad class of devices that may be used to implement the network functionality discussed here.

The wireless access network 15 interconnects with the core traffic network represented generally by the cloud at 16 via a serving packet gateway 56, which carries the user communications and data for the mobile device 14 between an eNodeB 18A, 18B and other elements with or through which the mobile devices communicate. The networks can also include other elements that support functionality such as messaging service messages and voice communications. Specific elements of the network 16 for carrying the voice and data traffic and for controlling various aspects of the calls or sessions through the network 16 are omitted here for simplicity. It will be understood that the various network elements can communicate with each other and other aspects of the illustrated system 10 and other networks (e.g., the PSTN (not shown) and the Internet 23) either directly or indirectly.

A mobile device 14 communicates over the air with an eNodeB 18A or 18B and through the traffic network 16 for various voice and data communications, e.g. through the Internet 23 with a server such as the application server 25. As mobile device 14 transitions between two eNodeBs, such as eNodeB 18A and eNodeB 18B, core network 16 and wireless access network 15 may utilize the techniques for delaying the establishment of a dedicated bearer channel as described in greater detail below.

Figure 2:
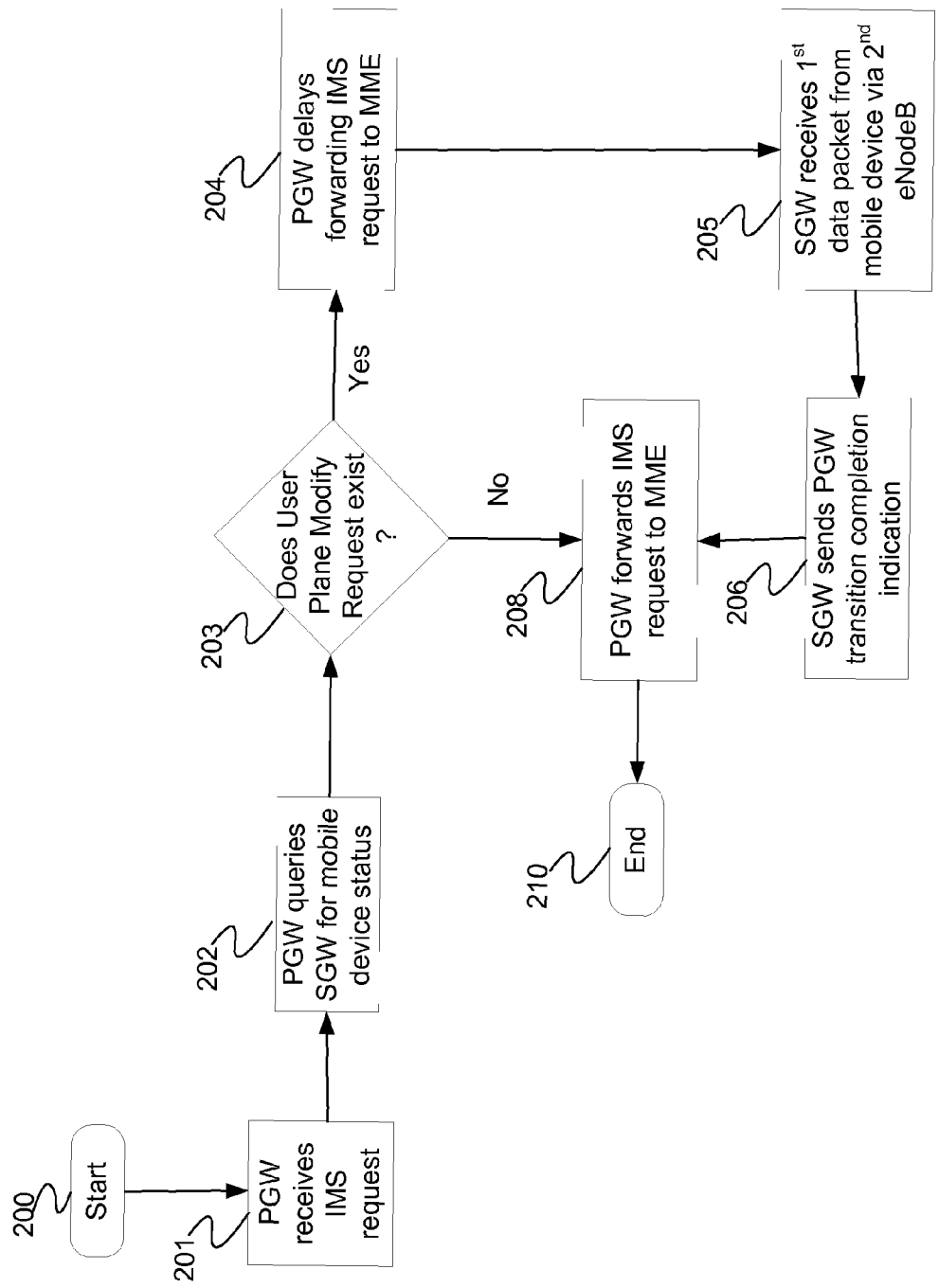
FIG. 2 is a flow diagram of an example of processing a handoff event and establishing a dedicated bearer channel as implemented by the system represented by FIG. 1.

Mobile network 16 includes one or more mobility management entities (MMES) 52 with which the PGW 54 interacts to establish a dedicated bearer channel during a handover of mobile device 14 between eNodeB 18A and eNodeB 18B, such as described in greater detail in relation to FIG. 2. In the LTE network 16, the MME 52 provides control and management functionality while SGW 56 performs data routing between mobile device 14 and PGW 54 (e.g., call data during a VoLTE call).

In one example, mobile device 14 is in proximity of and has a radio connection with eNodeB 18A. MME 52, in this example, maintains a record that mobile device 14 is currently served through or "connected" to eNodeB 18A. When a VoLTE call is established through core network 16 and wireless access network 15 with mobile device 14, IMS core network 51 will send a request to PGW 54 for a dedicated bearer channel to be established to support the VoLTE call. This request is, for example, an IP connectivity access network (CAN) session modification request. Such IP-CAN session modification request is, for example, a diameter message. Diameter is, for example, a protocol utilized to perform authentication, authorization and accounting within a network environment. The dedicated bearer channel is, for example, a logical or virtual path over which packet data associated with the VoLTE call will pass through wireless access network 15 and core network 16 with a guaranteed QoS suitable for voice communication. The dedicated bearer channel is established, for example, between the mobile device 14 and the SGW 56 currently serving mobile device 14 via eNodeB 18A. The dedicated bearer channel also extends, for example, from the SGW 56 to the PGW 54.

In this example, PGW 54 will forward the request from IMS core network 51 to MME 52. Based on the record that mobile device 14 is currently connected to eNodeB 18A maintained by MME 52, MME 52 will prompt SGW 56 to attempt to establish the dedicated bearer channel with mobile device 14 via eNodeB 18A. Once the dedicated bearer channel is established, the VoLTE call can proceed and the data associated with the VoLTE call will pass over the dedicated bearer channel.

In a further example, mobile device 14 transitions between eNodeB 18A and eNodeB 18B. For example, a user of mobile device 14 is traveling along a road and eNodeBs 18A, 18B provide coverage for corresponding portions of the road. Such a transition is commonly referred to as a handoff and/or handover. MME 52, however, will not update the maintained record of which eNodeB mobile device 14 is currently connected to until after the transition (e.g., handoff, handover) is complete. Thus, the record maintained by MME 52 will not reflect that mobile device 14 is currently connected to eNodeB 18B until after mobile device 14 has completed the transition.

In this further example, if a VoLTE call is initiated during the transition, MME 52 will prompt SGW 56 to attempt to establish the dedicated bearer channel with mobile device 14 via eNodeB 18A, but such attempt will fail because mobile device 14 is no longer connected to eNodeB 18A. If PGW 54, however, delays forwarding the request to establish the dedicated bearer channel from the IMS core network 51 to MME 52 until after the transition is complete, for example, MME 52 will have an updated record and MME 52 will prompt SGW 56 to attempt to establish the dedicated bearer channel with mobile device 14 via eNodeB 18B instead of eNodeB 18A.

FIG. 2 is a flow diagram of an example of a process to delay forwarding a request to establish a dedicated bearer channel until after a mobile device has transitioned between two wireless network nodes.

The process starts in step 200. In step 201, PGW 54 receives a request from IMS core network 51, for example, to establish a dedicated bearer channel to support a VoLTE call corresponding to mobile device 14. In one example, the request is an IP-CAN session modification request within a diameter message requesting establishment of the dedicated bearer channel to support an established voice call with mobile device 14. At this point, PGW 54 does not know whether mobile device 14 is transitioning between wireless network nodes of mobile network 16. In step 202, PGW 54 queries SGW 56, for example, to determine a status for mobile device 14.

In one example, when mobile device 14 begins to transition between two wireless network nodes, such as eNodeBs 18A, 18B, mobile device 14 generates a user plane modify request. This modify request informs SGW 56 that mobile device 14 is transitioning between eNodeB 18A and eNodeB 18B, for example. In response to the modify request, SGW 56 continues to maintain a default bearer channel with mobile device 14 via eNodeB 18A and creates a new default bearer channel with mobile device 14 via eNodeB 18B. Once SGW 56 receives a first data packet from mobile device 14 via eNodeB 18B, for example, SGW 56 determines that the transition is complete and destroys the default bearer channel with mobile device 14 via eNodeB 18A.

As such, in step 203, SGW 56 determines whether a user plane modify request for mobile device 14 exists and SGW 56 responds to the query from PGW 54 with the result of the determination. If a user plane modify request does not exist, the process proceeds to step 208 discussed in greater detail below. If a user plane modify request does exist, PGW 54 delays forwarding the request from the IMS core network 51 to MME 52 until mobile device 14 completes the transition. As part of the delay, PGW 54 sends, for example, a notice of the delay to IMS core network 51. In one example, the delay notice is a SIP 180-trying message.

In the transition example, SGW 56 receives, in step 205, a first data packet from mobile device 14 via eNodeB 18B and SGW 56 determines the transition is complete. Such first data packet is received, for example, over the default bearer channel between mobile device 14 and SGW 56 via eNodeB 18B. The first data packet is, for example, unrelated to the established VoLTE call or the request received by PGW 54 from IMS core network 51 in step 201. In one example, the first data packet is part of an existing data connection between mobile device 14 and SGW 56. As a result of receiving the first data packet from mobile device 14 via eNodeB 18B, SGW 56, in step 206, notifies PGW 54 that the transition is complete.

In step 208, PGW 54 forwards the request from IMS core network 51 to MME 52. As discussed above, PGW 54 forwards the request, in one example, without delay because SGW 56 determined no user plane modify request existed for mobile device 14. In an alternate example, PGW 54 delays forwarding the request, because a user plane modify request existed for mobile device 14, until SGW 56 notifies PGW 54 that the transition is complete. In either example, once MME 52 receives the request in step 208, MME 52 prompts SGW 56 to attempt to establish a dedicated bearer channel through mobile network 16 between mobile device 14 and SGW 56. If the dedicated bearer channel is established, data related to the VoLTE call is passed over the dedicated bearer channel in the normal manner. The process ends in step 210.

As shown by the description above, a variety of the related functions to delay forwarding of a request to establish a dedicated bearer channel may be implemented on servers. Although special-built hardware may be used, server functions often are implemented by appropriate programming to configure one or more general-purpose computer platforms that have interfacing to support communications via the particular network(s).

Figure 3:
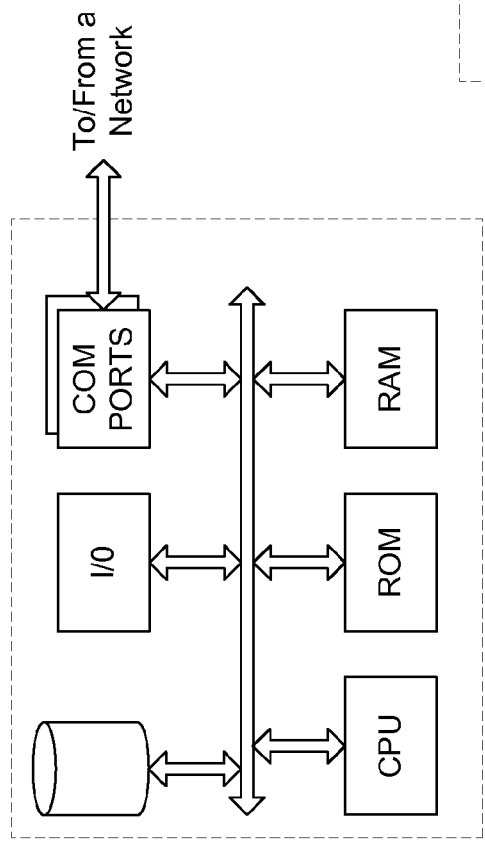
FIG. 3 provides a block diagram of a general purpose computer hardware platform that may be configured as a host or server, for example, to function as any of the server computers or eNodeBs shown in FIG. 1.
Figure 4:
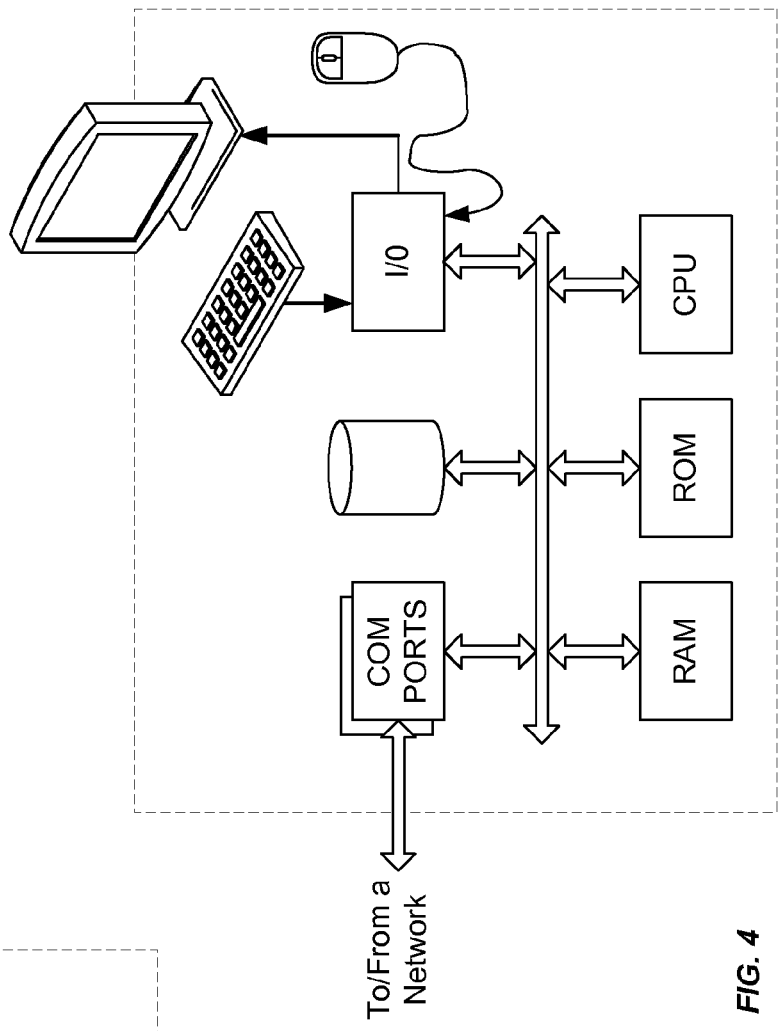
FIG. 4 is a simplified functional block diagram of a personal computer or other work station or user terminal device.

FIG. 3 provides a functional block diagram illustration of a general purpose computer hardware platform. More specifically, FIG. 3 illustrates a network or host computer platform, as may typically be used to implement a server, such as MME 52 and/or any of the other servers/platforms shown in FIG. 1. FIG. 4 depicts a computer with user interface elements, as may be used to implement a personal computer or other type of work station or terminal device, although the computer of FIG. 4 may also act as a server if appropriately programmed. It is believed that the general structure and general operation of such equipment as shown in FIGS. 3 and 4 should be self-explanatory from the high-level illustrations.

A server or host computer hardware platform, for example as might implement a packet gateway, includes a data communication interface for packet data communication (see FIG. 3). The server computer also includes processor hardware forming a central processing unit (CPU), in the form of one or more processors, for executing program instructions. The server platform typically includes an internal communication bus, program storage, and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. Although such generic computer configured by a program may be used to implement a packet gateway, such as PGW 54 and/or SGW 56, in some examples the packet gateway is a smart packet switch or router. For example, the communication ports of FIG. 3 implement a switch or routing fabric, either via specialized hardware and/or programming. The software programming relating to the location techniques discussed herein may be downloaded and/or updated from a computer platform, for example, to configure the PGW or other server (e.g. FIG. 1) or from a host computer or the like communicating with the mobile device via the network (e.g. FIG. 1).

A computer type user terminal device, such as a PC or tablet computer, similarly includes a data communication interface, processor hardware forming a CPU, main memory and one or more mass storage devices for storing user data and the various executable programs (see FIG. 4). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the techniques to delay forwarding of a request to establish a dedicated bearer channel and related communications outlined above may be embodied in programming. Program aspects of the technology may be thought of as "products" or "articles of manufacture" typically in the form of executable code and/or associated list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory or tangible storage media, more general terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A network device, comprising:
a memory to store instructions; and
one or more processors, coupled to the memory to execute the instructions to:
receive, from an Internet protocol multimedia subsystem (IMS) core network, a request to establish a dedicated bearer channel, through a mobile wireless communication network, between a mobile device and a serving gateway communicating with the mobile wireless communication network;
determine whether the mobile device is transitioning from a first node of the mobile wireless communication network to a second node of the mobile wireless communication network,
the one or more processors, when determining whether the mobile device is transitioning, are to:
provide, to the serving gateway, a query requesting whether a user plane modify request related to the mobile device exists,
receive, from the serving gateway and based on the query, a response indicating whether the mobile device is transitioning from the first node to the second node, and
determine whether the mobile device is transitioning from the first node to the second node based on the response; and
process the request based on whether the mobile device is transitioning from the first node to the second node.

2. The network device of claim 1, wherein the network device
includes a packet data network gateway.

3. The network device of claim 1, wherein:
the mobile device is determined to be transitioning when the response indicates a user plane modify request related to the mobile device exists; and
the mobile device is determined not to be transitioning when the response indicates no user plane modify request related to the mobile device exists.

4. The network device of claim 1, wherein, upon determining the mobile device is transitioning, the one or more processors are further to:
delay forwarding the request to a mobility management entity of the mobile wireless communication network.

5. The network device of claim 1, wherein the one or more processors are further to:
send an indication of a delay to the IMS core network; and
wait until receipt of an indication that the transition is complete based on the serving gateway receiving a first data packet from the mobile device.

6. The network device of claim 5, wherein the indication of the delay is sent via session initiation protocol (SIP).

7. The network device of claim 5, wherein the indication of the delay includes a session initiation protocol (SIP) 180-trying message.

8. The network device of claim 5, wherein, upon receipt of the indication that the transition is complete, the one or more processors are further to:
forward the request from the IMS core network to a mobility management entity to prompt the mobility management entity to attempt to fulfill the request.

9. The network device of claim 1, wherein, upon determining the mobile device is not transitioning, the one or more processors are further to:
forward the request from the IMS core network to a mobility management entity to prompt the mobility management entity to attempt to fulfill the request.

10. A method, comprising:
receiving, by a network device and from an internet protocol (IP) multimedia services (IMS) core network, a request to establish a dedicated bearer channel, through a mobile wireless communication network, between a mobile device and a serving packet data network gateway within the mobile wireless communication network,
the request to be forwarded to a mobility management entity of the mobile wireless communication network to prompt the mobility management entity to attempt to fulfill the request;
determining, by the network device, whether the mobile device is transitioning from a first node of the mobile wireless communication network to a second node of the mobile wireless communication network,
determining whether the mobile device is transitioning from the first node to the second node including:
providing, to the serving packet data network gateway, a query requesting whether a user plane modify request related to the mobile device exists,
receiving, from the serving packet data network gateway and based on the query, a response indicating whether the mobile device is transitioning from the first node to the second node, and
determining whether the mobile device is transitioning from the first node to the second node based on the response; and
processing, by the network device, the request based on whether the mobile device is transitioning from the first node to the second node.

11. The method of claim 10, wherein the network device includes a packet data network gateway.

12. The method of claim 11, wherein:
the mobile device is determined to be transitioning when the response indicates a user plane modify request related to the mobile device exists; and
the mobile device is determined not to be transitioning when the response indicates no user plane modify request related to the mobile device exists.

13. The method of claim 10, wherein, upon a determination that the mobile device is transitioning, the method further comprises:
delaying forwarding of the request to the mobility management entity.

14. The method of claim 10, wherein the method further comprises:
sending an indication of a delay to the IMS core network; and
waiting until receipt of an indication that the transition is complete based on the serving packet data network gateway receiving a first data packet from the mobile device.

15. The method of claim 14, wherein the indication of the delay is sent via a session initiation protocol (SIP).

16. The method of claim 14, wherein the indication of the delay includes a session initiation protocol (SIP) 180-trying message.

17. The method of claim 14, wherein, upon receipt of the indication that the transition is complete, the method further comprises:

forwarding the request from the IMS core network to the mobility management entity to prompt the mobility management entity to attempt to fulfill the request.

18. The method of claim 10, wherein, upon a determination that the mobile device is not transitioning, the method further comprises:

forwarding the request from the IMS core network to the mobility management entity to prompt the mobility management entity to attempt to fulfill the request.

19. A non-transitory computer-readable medium for storing instructions, the instructions comprising:

one or more instructions that, when executed by one or more processors, of a network device, cause the one or more processors to:

receive, from an Internet protocol multimedia subsystem (IMS) core network, a request to establish a dedicated bearer channel, through a mobile wireless communication network, between a mobile device and a serving gateway connected to the mobile wireless communication network;

determine whether the mobile device is transitioning from a first node of the mobile wireless communication network to a second node of the mobile wireless communication network, the one or more instructions, that cause the one or more processors to determine whether the mobile device is transitioning, cause the one or more processors to:

provide, to the serving gateway, a query requesting whether a user plane modify request related to the mobile device exists, receive, from the serving gateway and based on the query, a response indicating whether the mobile device is transitioning from the first node to the second node, and whether the mobile device is transitioning from the first node to the second node based on the response; and process the request based on whether the mobile device is transitioning from the first node to the second node.

20. The non-transitory computer-readable medium of claim 19, where:

the mobile device is determined to be transitioning when the response indicates a user plane modify request related to the mobile device exists; and the mobile device is determined not to be transitioning when the response indicates no user plane modify request related to the mobile device exists.

* * * * *